United States Patent [19]
Markus

[11] Patent Number: 4,748,711
[45] Date of Patent: Jun. 7, 1988

[54] ICE/SNOW SCRAPING SYSTEM

[76] Inventor: Franklyn M. Markus, 5720 Rembrandt Avenue, #702, Cote St. Luc, P.Q., Canada, H4W 3A1

[21] Appl. No.: 906,479

[22] Filed: Jun. 12, 1986

[51] Int. Cl.$^4$ ............................................. B60S 3/00
[52] U.S. Cl. ................................... 15/227; 15/236 R
[58] Field of Search ............... 15/236 R, 405, 111, 15/227

[56] References Cited

U.S. PATENT DOCUMENTS

| | | | |
|---|---|---|---|
| 3,116,502 | 1/1964 | Gerber | 15/105 |
| 4,275,476 | 6/1981 | Hopkins et al. | 15/236 R |
| 4,305,175 | 12/1981 | Burgess | 15/236 R |
| 4,538,320 | 9/1985 | Batt | 15/236 R |
| 4,546,513 | 10/1985 | Hammond | 15/236 R |
| 4,683,592 | 8/1987 | Strongwater | 15/236 R X |

FOREIGN PATENT DOCUMENTS

| | | | |
|---|---|---|---|
| 2911934 | 10/1980 | Fed. Rep. of Germany | 15/236 R |
| 3121319 | 12/1982 | Fed. Rep. of Germany | 15/236 R |

Primary Examiner—Chris K. Moore
Attorney, Agent, or Firm—Paul J. Sutton

[57] ABSTRACT

An ice/snow scraping system includes a ribbed grip handle, shielded from ice, snow and moisture by a sleeve which is open at the rear, and a removeable scraper head. The head includes a downward biased portion incorporating the scraper's edge to provide optimum scraping angle while safely spacing the handle from the ice, strengthening ribs positioned for resistance to torque and thrust forces, and a strip of raised serrations for abraiding the ice. Mating abutments on the head and handle transfer torque and thrust back to the handle. Pin interlock resists accidental disassembly. The scraper head abutment is shaped to protect the sleeve-to-handle seal from run off when the system is hung up to a mounting hole provided in the biased portion.

6 Claims, 4 Drawing Sheets

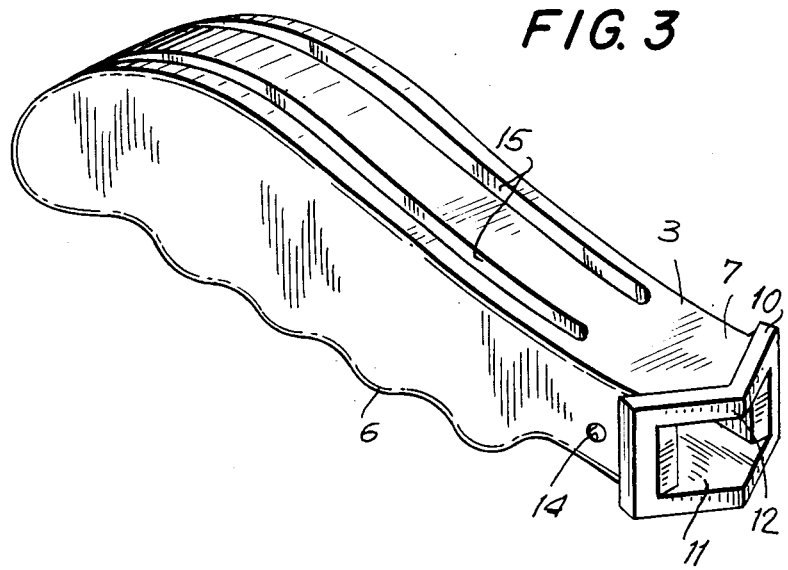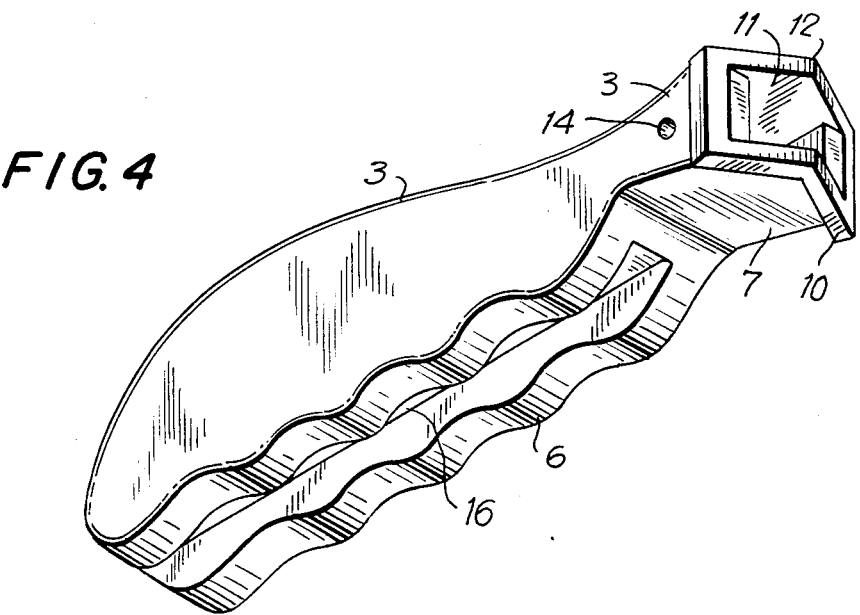

ICE/SNOW SCRAPING SYSTEM

BACKGROUND OF THE INVENTION

1. Field of the Invention

In general this invention relates to brushing, scrubbing and general cleaning, and more particularly to a hand held scraper for removing snow and ice and the like from a relatively smooth surface such as an automobile windshield.

2. Description of the Prior Art

Hand held ice scrapers are generally of one piece construction having a scraping edge. Often the scraping edge will have fingers or slits for abrading or chipping the ice.

One such scraper for example, is described in U.S. Pat. No. 4,141,111 of Feb. 27, 1979 issued to Hopkins et al., in which there is described a one piece scraper having a handle and a straight edge scraping surface displaced below the handle by means of a curved intermediate section. The scraping edge is angled so that the optimum scraping angle is made when the hand of the user is spaced safely from the surface of the ice being removed.

Another invention, U.S. Pat. No. 4,164,801 of Aug. 21, 1979 issued to Thomas, teaches an ice scraper similar to that just described which however includes several independent, relatively flexible fingers, formed as part of the scraping surface to induce formation of fractures in the ice while scraping. The fingers also aid in conforming to an irregular surface being scraped. Such fingers, however, allow discontinuity in the straight scraping edge, leaving tracks of snow and ice particles behind on the surface being cleaned.

A chopping and scraping instrument is described by U.S. Pat. No. 2,719,316 of Oct. 4, 1955 issued to A. K. Hauser wherein the instrument comprises a relatively thin substantially rigid flat hand held paddle shaped member with a scalloped scraping edge. Such a device provides a more aggressive surface for abrading the ice to enable its break up. However, the sraight edge again is sacrificed.

U.S. Pat. No. 4,121,316 of Oct. 24, 1978 issued to Perry describes a hand held device for scraping ice or frost from vehicle windows and windshields, comprising of an essentially flat flexible member, smooth on one side and having a series of parallel recesses running perpendicular to the scraping edge, located on the other side. The scraping edge is concave along its edge so that the tool presents at one aspect a sharp scraping edge and flipped over, presents narrow sharp cutting edges located on a straight line. In operation the tool is held between the forefingers and the thumb and forced across the iced surface at a low angle. This device offers less protection than the Hopkins et al. device for prevention of injury to the users hand by the roughened ice.

A further improvement in the Hopkins device is described in U.S. Pat. No. 4,275,476 of June 30, 1981 issued to Hopkins et al., in which the flexible fingers are joined by a continuous flexible edge that is a few thousandths of an inch thick. The device thus provides an unbroken edge for cleaner scraping of the iced surface, and fingers for abrading and chipping of the ice. The blade is continuous but relatively breakable because the slots forming the fingers extend down to the edge which also serves as a thin flexible membrane to permit the fingers to move up and down during operation.

Presently hand held ice and snow scraping tools may be found which variously provide a straight edge for scraping, a second surface for abrading and a handle angled away from the surface being scraped to provide some measure of safety for the user's hand.

Regardless of the tool used, users are often faced with the prospect of scraped hands or bruised knuckles, soiled cuffs and wet watches. Furthermore tools with handles long enough to allow some distance between the user's hand and the ice are difficult to conveniently store in a vehicle for ready access.

The present invention is a system provided to overcome these difficulties and to provide additional benefits.

SUMMARY OF THE INVENTION

It is one object of the invention to provide an ice/snow scraping system having an unbroken, straight scraping edge.

It is another object is to provide an abrading surface which is separate from the scraping edge.

Another other object is to provide a scraper which provides safe spacing for the user's hand from the ice when in use.

Another object is to provide an ice/snow scraping system which provides protection for the user's hand and cuffs.

And yet another object is to provide an ice/snow scraping system that provides the above benefits which may be disassembled for easy storage and access in a vehicle.

Other objects and advantages of the invention will become readily apparent to persons versed in the art from the ensuing description thereof.

In accordance with the invention there is provided an ice/snow scraping system that includes a handle having a ribbed grip surface and a V shaped abutment. The abutment has a key hole for receiving a key post that is provided as part of a mating removable scraper head. An abutment on the scraper head's key post mates with the handle's abutment for transmitting thrust and torque forces received by the scraper head, back to the handle. Strengthening ribs are provided on the head, positioned for resistance to the torque and thrust forces. A rigid straight edge for scraping is located on a biased portion of the scraper head to simultaneously provide proper scraping angle and safe handle spacing from the ice. A strip of raised serrations are located on the top of the scraper head's biased portion for abrading the ice. A flexible sleeve which encloses the handle for protecting the user's hand and cuff from abrasion, moisture and dirt, is sealingly attached to the handle behind the abutment by elastic means. Pin interlock is provided to resist accidental disassembly of the system. A mounting hole is located and the scraper head's abutment is shaped so that the assembled system may be hung with run off from the scraper head by passing the sleeve-to-handle seal.

BRIEF DESCRIPTION OF THE DRAWINGS

In order that the invention may be more fully comprehended it will now be described, by way of example, with reference to the accompanying drawings, in which:

FIGS. 3 and FIG. 4 are perspecitve views of the handle showing its various features.

DESCRIPTION OF THE PREFERRED EMBODIMENTS

Figure 1:
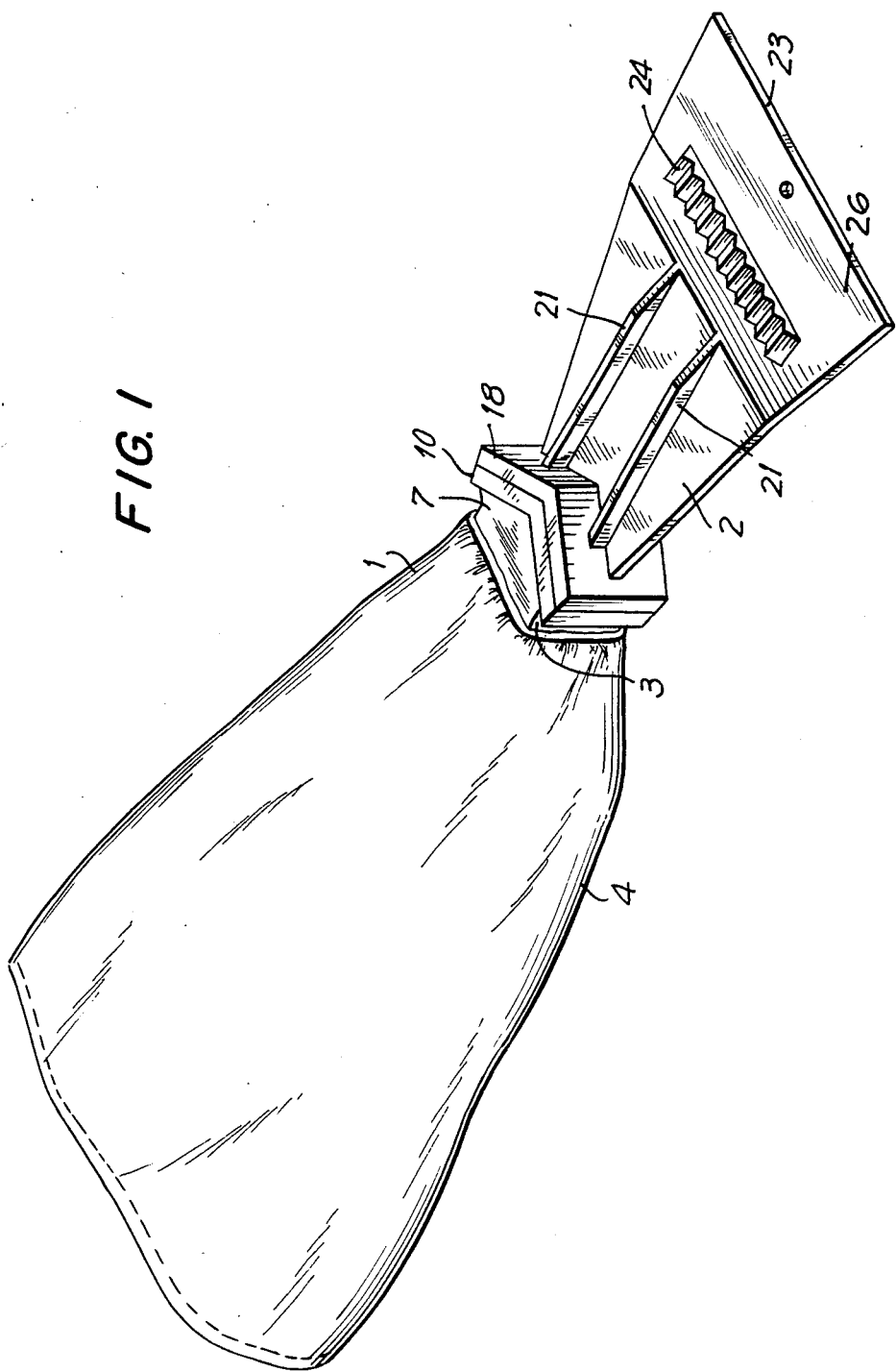
FIG. 1 is a top perspective view of the assembled system.

Before explaining the invention in detail, it is to be understood that the invention is not limited in its application to the detail of construction and arrangement of parts illustrated in the drawings, since the invention is capable of other embodiments. It is also to be understood that the phraseology or terminology employed is for the purpose of description only and not of limitation.

Referring to the drawings in which like parts are designated by the same number throughout the various figures, FIG. 1 shows the assembled ice/snow scraping system in which scraper head 2 is installed in handle 3 the rearward portion of which is enclosed in sleeve 4 for protecting the user's hand and clothing from moisture and dirt and to keep the scraper handle dry for additional grip.

Figure 2:
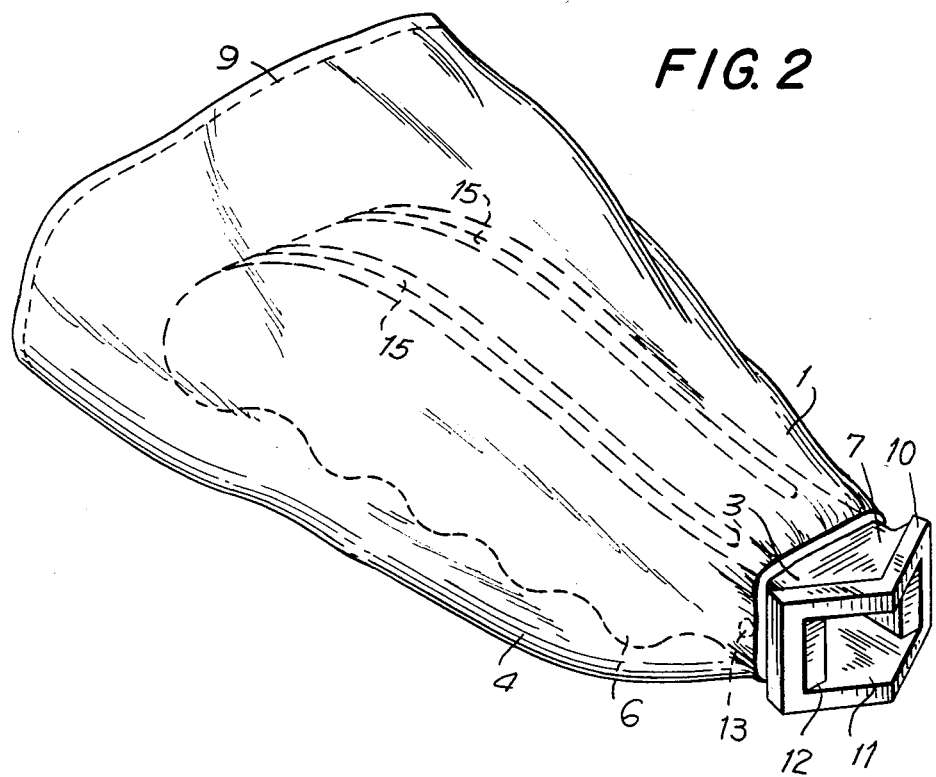
FIG. 2 is a perspective view of the handle and sleeve. Location of the portion of the handle within the sleeve is shown.

Referring to FIG. 2, sleeve 4's rearward opening provides user access to ribbed hand grip 6. Sleeve 4 is made from thin resiliant plastic which serves as an efficient moisture barrier and to prevent scuffing injury or cuts from ice scrapings. The sleeve may be joined to the handle at constricted neck 7 by glue, ultrasonic welding or other conventional permanent fastening means and it is within the contemplation of the invention that it may be retained by an elastic portion 8 for retaining and sealing. A groove may also be included around the neck for receiving the elastically bound portion of the sleeve. Pin 13 is included in the elastically retained sleeve for locking the assembly comprising the sleeve, handle and scraper head together as one integral unit. An opening 14 is provided on the side of the handle for receiving pin 13 of the elastically retained sleeve.

To prevent tearing of the material forming the rearward opening 5, the material is folded back and fastened by stitching, ultrasonic welding or other suitable means.

FIG. 3 illustrates handle 3 alone, the front of which is a V shaped abutment 10, designed to withstand torque and thrust. Opening 11 at face 12 is keyed to accept the scraper head.

Lightening grooves 15 at the top of the handle and 16 at the bottom of the handle are provided for lightening the assembly and for economy of manufacture.

Figure 5:
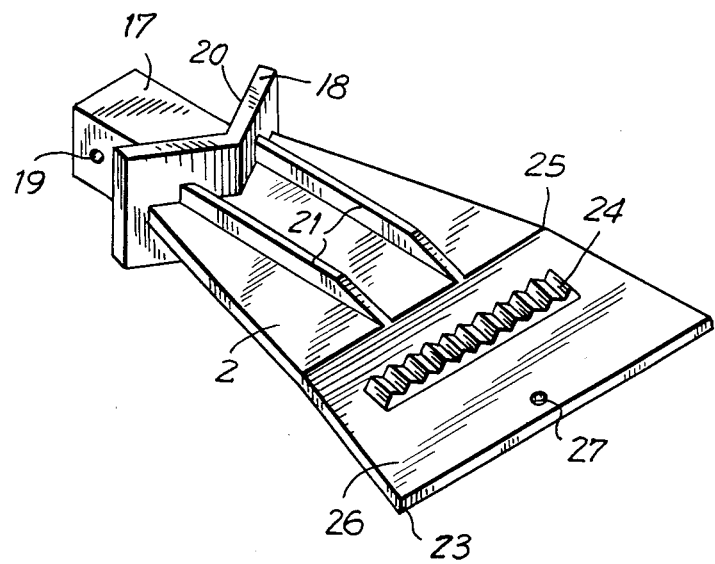
FIGS. 5 and 6 are perspective views of the scraper head showing its various features.

Head 2, FIG. 5 includes keyed mounting post 17, V shaped abutment 18 and pin receiving opening 19. During assembly of the system, key post 17 of head 2 is inserted into keyed opening 11 of the handle until face 20 meets with face 12 forming a rigid coupling which will effectively transfer thrust and torque while remaining in alignment.

Figure 7:
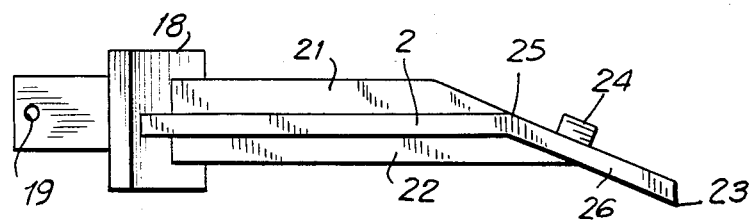
FIG. 7 is a side view of the head, including illustration of the V shaped abutment, strengthening ribs, bend line for the biased portion and the scraping edge in profile.
Figure 6:
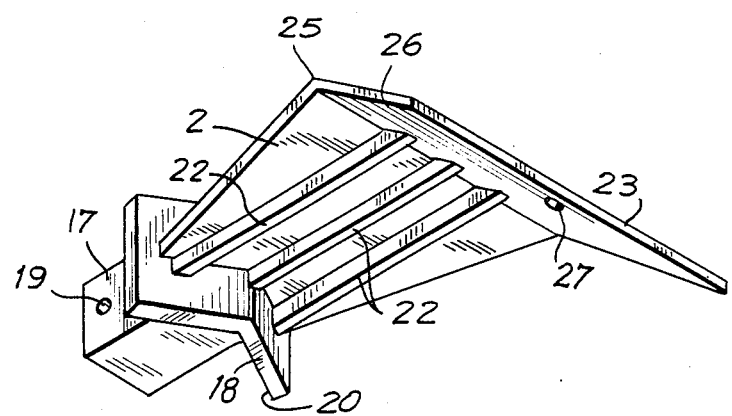

In acutal use of the ice and snow scraper system, thrust and torque forces are considerably higher than tension forces developed on the coupling. Although friction fit between key post 17 and keyed opening 11 will usually suffice to maintain the coupling against tension force, pin 13 may also be used to provide additional locking by its insertion through hole 14 in the handle and into opening 19 in the head. The scraper head, FIGS. 5, 6 and 7 is subjected to strong vertical thrust force in use. It is therefore provided with strengthing ribs 21 at the top and 22 on the bottom. A smooth chisel shaped front edge 23 is provided for separating snow and thin ice from the surface being cleaned. A strip of raised serrations 24 provides a surface at the top of the scraper head for abrading ice to facilitate its removal by edge 23.

In the embodiment shown, edge 23 and serrated strip 24 are perpendicular to an imaginary centerline which bisects the scraper lengthwise, so that forces encountered in use are transferred directly back to the handle.

Scraper head 2 is biased downward from its top surface by about 20 degrees, bending on transverse line 25 located near the front end of supporting ribs 21 and behind the strip of raised serrations 24. Support ribs 22 on the bottom surface of the head extend beyond bend line 25 to join the biased portion at the middle of its bottom face in order to provide support against thrust and torque transmitted to the upper face of the biased portion by the strip of raised serrations. It is understood that the bias angle is not limited to 20 degrees. It may be selected to complement the handle shape in a manner that provides best angle of attack for lifting ice and snow from a surface while permitting the handle and user's hand to be safely spaced from the roughened sharp ice and snow that is on the surface to be cleaned.

A hole 27 for hanging the system is included in the biased portion 26, located so that the system hangs handle down. V shaped abutment 18 extending beyond neck 7, serves as a deflector for melting snow and ice so that the run off by passes neck 7 of the handle and the seal of the sleeve to the handle at that place.

By means of the above description, it will be seen that there is provided an ice and snow scraping system which is light weight yet sturdy enough to resist thrust and torque forces encountered in removing snow and ice which is strongly adhered to smooth surfaces.

It provides a surface for abrading the ice to facilitate its removal by lifting off with a wide chisel edge that is biased for optimum angle of attack while the operators hand may be safely spaced from rough ice and snow. And it provides a sleeve to protect the operator's hand and clothing sleeve from snow and dirt. Moreover the system can be dissasembled for easy storage into two pieces comprising the scraper head and sleeve with enclosed handle, or into three pieces comprising the head, the sleeve and the handle, depending on the embodiment of the invention.

Although a detailed description of the invention has been provided, it is not intended that such details be limitations upon the scope of the invention. It will be obvious to those skilled in the art that various modifications and substitutions may be made without departing from the spirit and scope of the invention as set forth in the following claims.

What is claimed is:

1. An system capable of scraping ice or snow which comprises, in combination;
   a handle having a front end, a back end and a virtual centerline,
   a first abutment on the front end of the handle,
   a keyhole located in the forward face of the abutment for receiving a key post,
   a scraper head having a front end, a top surface, a bottom surface, a back end and a virtual centerline, a key post on the back end of the head, extending along its centerline, shaped for close fit to said keyhole, a second abutment located forward on the key post for mating with the first abutment when the post is inserted into the keyhole, a rigid straight edge for scraping, located at the front of the scraper head and extending substantially perpendicularly with respect to the head's centerline, a forward portion of the head being biased so that a virtual plane that includes the straight edge forms an acute angle with the centerline, a strip of raised serrations located on the top of the scraper on the biased portion for abrading, and a flexible sleeve which encloses the handle, sealingly formed around the handle behind the first abutment and having an opening near the back of the handle and having sufficient space about said enclosed handle to permit hand access to the handle for holding it from within the sleeve, said first abutment including a V-shaped portion and being positioned with the apex of the V located on the centerline of the handle, and the second abutment being v-shaped.

2. The invention recited in claim 1 in which the handle includes a constricted neck portion located behind and close to the first abutment in the region where the sleeve is sealed to the handle.

3. The invention recited in claim 2 in which the handle further includes a ribbed hand grip surface and, the scraper head includes strengthening ribs on its top surface and bottom surface, positioned for resistance to torque and thrust forces received from scraping and abrading.

4. The invention recited in claim 1, 2 or 3 further comprising:

a first opening in the key post for receiving a pin and, a second opening through the handle, positioned behind the first abutment and oriented so that when a pin is inserted into the second opening it will enter the first opening when the key post is inserted in the key hole with the first and second abutment mated.

5. The invention as recited in claim 4 in which the sleeve includes an elastic means for retaining the sleeve upon, and forming said seal around the handle.

6. An ice/snow scraping system which comprises, in combination:

a handle having a front end, a back end, a virtual centerline and a ribbed hand grip surface, a first V shaped abutment on the front end of the handle with the apex of the V on the centerline, a constricted neck portion located behind and close to the first abutment and containing a groove around the handle for receiving elastic sealing means, a keyhole located in the forward face of the abutment for receiving a key post, a scraper head having a front end, a top surface, a bottom surface, a back end and a virtual centerline, a key post on the back end of the head, extending along its centerline, shaped for close fit to said keyhole, a second V shaped abutment located forward on the key post for mating with the first abutment when the post is inserted into the keyhole, a rigid straight edge for scraping, located at the front of the scraper head and perpendicular to the head's centerline, ribs, positioned on the top and bottom surface of the scraper head for resistance to torque and to thrust forces received from scraping and abrading, a forward portion of the head being biased so that a virtual plane that includes the straight edge forms an acute angle with the centerline, a strip of raised serrations located on the top of the scraper on the biased portion for abrading, a flexibe sleeve which encloses the handle, elastic means for retaining and sealing the sleeve around the handle in said groove, said sleeve having an opening near the back of the handle and having sufficient space about said enclosed handle to permit hand access to the handle for holding it from within the sleeve, a first opening the key post for receiving a pin and, a second opening through the handle, positioned behind the first abutment and oriented so that when a pin is inserted into the second opening it will enter the first opening when the key post is inserted in the keyhole with the first and second abutment mated, a hole for hanging, located in the forward biased portion of the scraper head so that the system hangs with its centerline vertical, and said second abutment being sufficiently wide at its edges so that it shields the sleeve's seal from melted snow runoff when the system is hung by said hole for hanging.

* * * * *